(12) United States Patent
Murray

(10) Patent No.: US 8,839,332 B2
(45) Date of Patent: Sep. 16, 2014

(54) SYSTEM AND METHOD TO FACILITATE REPEAT BROADCASTS OF CONTENT

(76) Inventor: Michael Martin Murray, Greenwich, CT (US)

( * ) Notice: Subject to any disclaimer, the term of this patent is extended or adjusted under 35 U.S.C. 154(b) by 337 days.

(21) Appl. No.: 13/437,085

(22) Filed: Apr. 2, 2012

(65) Prior Publication Data

US 2013/0028438 A1    Jan. 31, 2013

Related U.S. Application Data

(63) Continuation of application No. 12/344,472, filed on Dec. 27, 2008, now Pat. No. 8,151,313.

(51) Int. Cl.
H04N 7/16    (2011.01)
H04N 7/173   (2011.01)
H04N 7/20    (2006.01)

(52) U.S. Cl.
CPC ............... *H04N 7/20* (2013.01); *H04N 60/11* (2013.01); *H04N 20/40* (2013.01)
USPC ...................................... 725/118

(58) Field of Classification Search
CPC ................................ H04N 7/16; H04N 7/173
USPC .......................................... 725/118
See application file for complete search history.

(56) References Cited

U.S. PATENT DOCUMENTS

| 8,151,313 | B2 * | 4/2012 | Murray | 725/118 |
|---|---|---|---|---|
| 2010/0169936 | A1 * | 7/2010 | Murray | 725/63 |
| 2013/0028438 | A1 * | 1/2013 | Murray | 381/77 |

* cited by examiner

*Primary Examiner* — Kieu Oanh T Bui

(57) ABSTRACT

A system for delivering content to users from a content provider including a transmission system for transmitting content in a series of segments and a plurality of receivers, each of the receivers comprising a memory, a processor, and an output driver. The memory may have stored therein instructions that, when executed, will cause the processor to perform the following steps: (1) comparing each of the received segments to any previously stored segments to determine whether each received segment has been previously stored; (2) for a particular received segment that has not been previously stored, storing the segment in the memory; (3) for a particular received segment that has been previously stored, determining whether the received segment is missing data and, if it is, retrieving the missing data, if available, from the corresponding previously stored segment; and (4) providing each of the received segments to the output driver along with any missing data retrieved from the memory. In preferred embodiments, the system is useful for enabling the smooth provision of content to a user as any missing data contained in a received data stream can be obtained, if available, in the memory.

9 Claims, 6 Drawing Sheets

SYSTEM AND METHOD TO FACILITATE REPEAT BROADCASTS OF CONTENT

RELATED APPLICATION INFORMATION

This application is a continuation of application Ser. No. 12/344,472, filed on Dec. 27, 2008, now U.S. Pat. No. 8,151,313, incorporated herein by reference.

FIELD OF THE INVENTION

This invention relates to the field of media transmission systems and, in certain embodiments, to an improved system and method for delivering content to a user.

BACKGROUND OF THE INVENTION

People have an almost insatiable appetite for content, everything from music to videos, to full-length movies. There is a need to improve the delivery of content to users in order to make delivery more reliable. There are numerous delivery systems known in the art. For example, audio and video have long been delivered to users using a broadcast transmission system (e.g., using large land-based antennas) where the users are provided with suitable receivers, such as radios and televisions. More recently, satellite radio transmissions are beginning to replace traditional radio broadcasts, as customers demand more content and fewer commercials. With satellite radio a large variety of channels can be provided, often with few or even no commercials. Satellite television is similarly gaining in popularity. The Internet is becoming an increasingly popular mechanism for delivering content to users as well.

One disadvantage of wireless transmission systems is that the signal can be blocked, causing a loss in transmission. For example, weather can interrupt a satellite transmission. Mobile satellite receivers can also be blocked as they pass under trees, bridges and other obstructions. These same issues apply to other types of wireless broadcasts, such as land-based microwave transmissions. Even wired content delivery systems can suffer interruptions in service caused by noise on the line or other interference.

SUMMARY OF THE INVENTION

In one aspect, the invention features a system for delivering content to users from a content provider, the system comprising: a transmission system for transmitting content in a series of segments, each of the segments including an identification code, wherein the transmission system further transmits identification codes associated with previously transmitted segments; a plurality of receivers for receiving the series of segments transmitted from the transmission system and storing the segments, each of the receivers comprising a non-volatile memory, a processor, and an output driver, the non-volatile memory having stored therein instructions that, when executed, will cause the processor to perform the following steps:
(1) upon receipt of a segment, storing the segment, including its associated identification code, in the non-volatile memory, and providing the segment to the output driver (such as a speaker or display); and
(2) upon receipt of an identification code without a segment, locating a previously stored segment associated with the received identification code and providing the previously stored segment to the output driver.

The memory can be either one physical memory or a plurality of physically distinct memories.

The transmission system may be a wireless transmission system. It further may comprise a ground based antenna and a plurality of satellites. Alternatively, a ground-based antenna may transmit directly to the receivers. The transmission system can also be configured in other ways, such as a series of ground-based antennas.

Each of the receivers can further comprise an antenna and a memory for temporarily storing the series of segments as they are received. This memory can be physically the same memory as the memory mentioned above or a different memory. A data bus may be used to link the various components.

The series of segments can comprise data, songs, commercials, video, spoken words or any combination thereof. The output device coupled to the output driver can be one or more speakers and/or displays, as appropriate depending on the nature of the data to be transmitted.

Each of the segments can comprise a code that identifies the segment as either a segment that will be transmitted multiple times or as a segment that will be transmitted only once. The instructions can optionally cause the processor to perform steps (1), (2) and (3) above only for those segments that have the code indicating that they will be transmitted multiple times.

In another aspect, the invention features a system for delivering audio content to users from a content provider, the system comprising a transmission system for transmitting content in a series of audio segments and a plurality of receivers for receiving the series of audio segments transmitted from the transmission system, each of the receivers comprising a memory, a processor, and an output driver. The memory has stored therein instructions that, when executed, will cause the processor to perform the following steps: (1) comparing each of the received audio segments to any previously stored segments to determine whether each received audio segment has been previously stored; (2) for a particular received audio segment that has not been previously stored, storing the audio segment in the memory; (3) for a particular received audio segment that has been previously stored, (i) determining whether the received audio segment is missing data and, if it is, retrieving the missing data, if available, from the corresponding previously stored audio segment and (ii) determining whether the previously stored audio segment is missing data and, if it is, obtaining the missing data from the received audio segment, if available, and storing the missing data in the memory to thereby create a more complete copy of the audio segment in the memory; and (5) providing each of the received audio segments to the output driver along with any missing data retrieved from the memory.

DETAILED DESCRIPTION OF CERTAIN EMBODIMENTS

Figure 1:
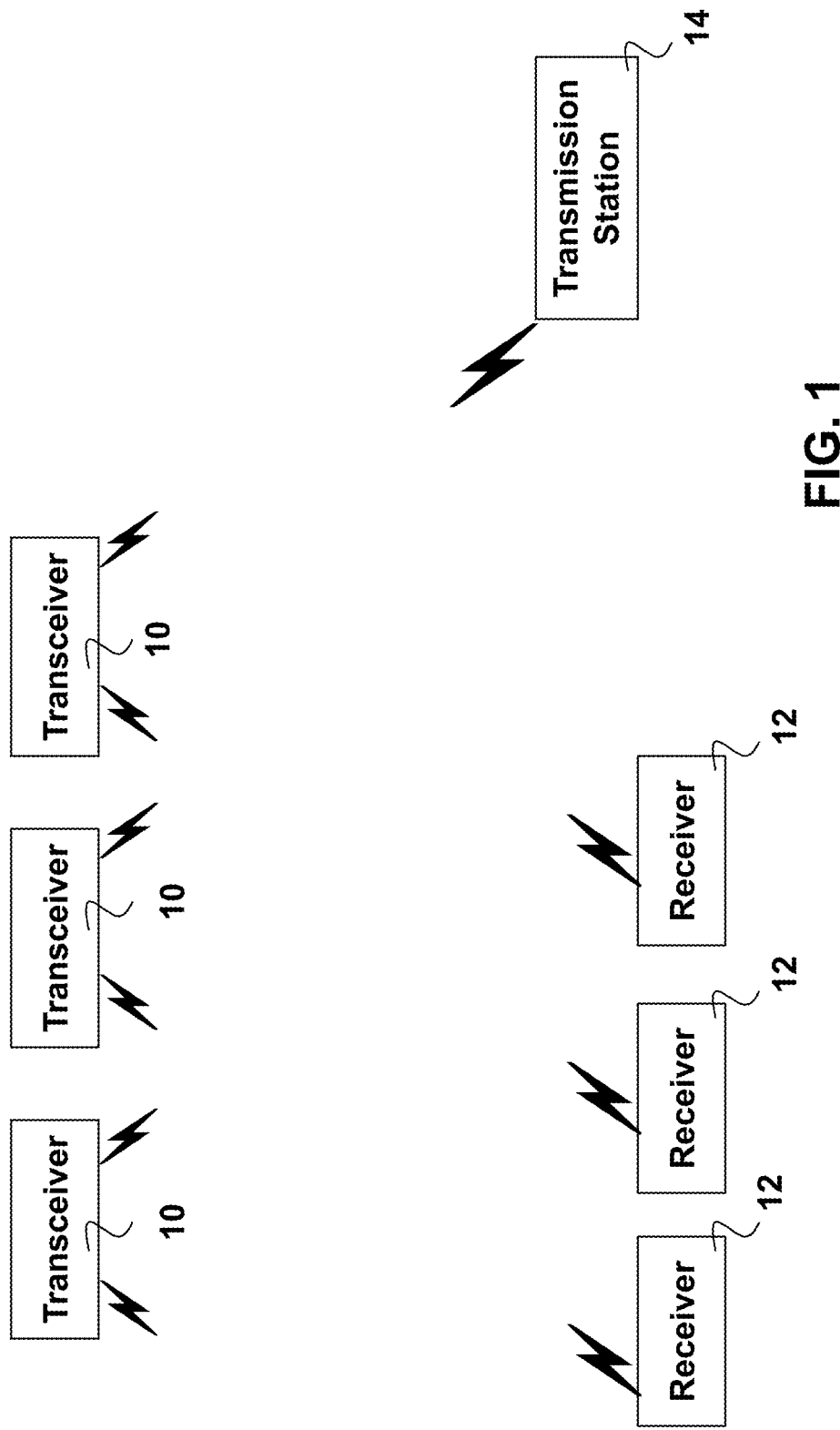
FIG. 1 is a block diagram of one embodiment of a data transmission system.
Figure 2:
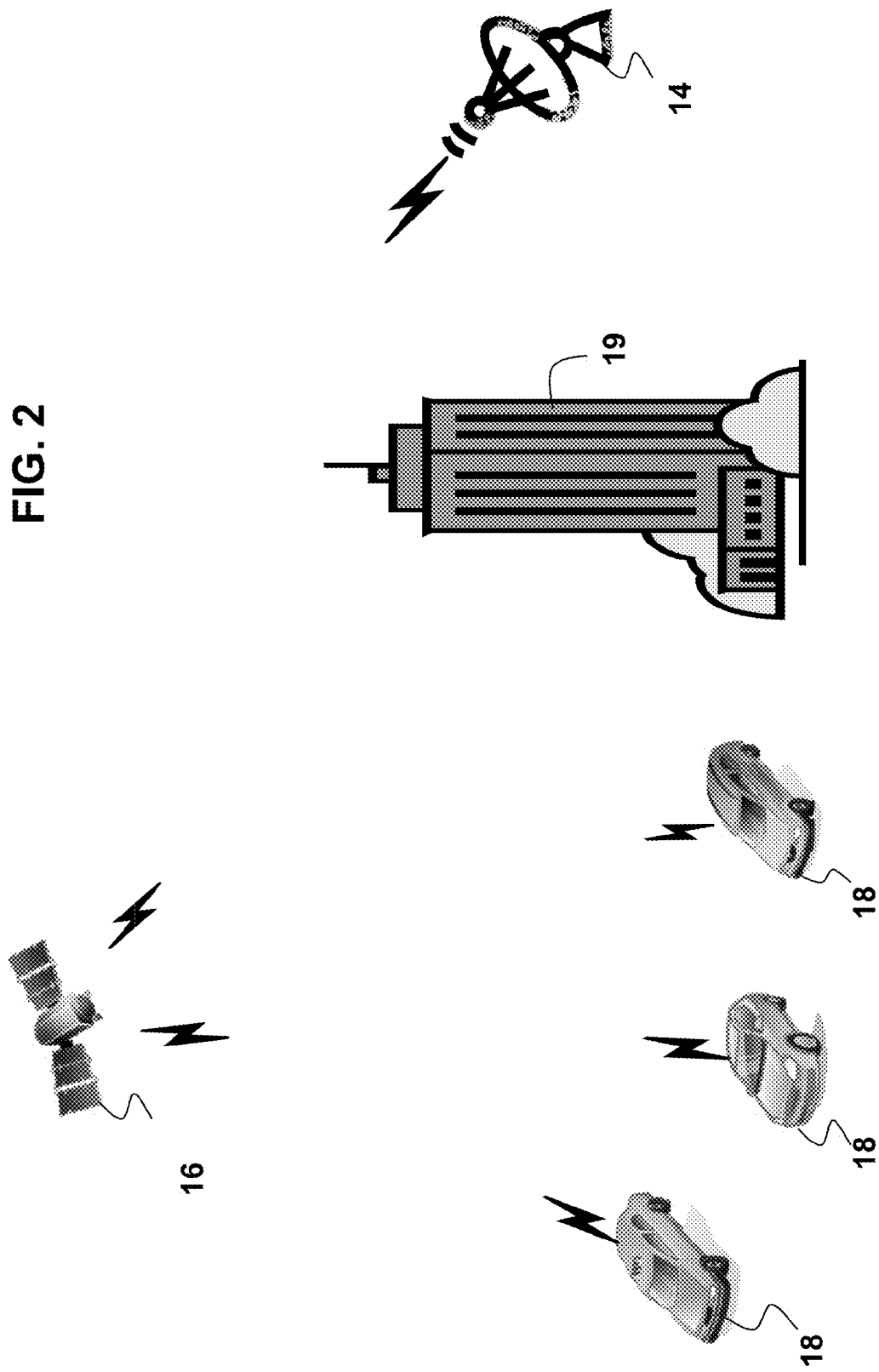
FIG. 2 is a graphical representation of the system of FIG. 1.

Referring to FIG. 1, a block diagram of one embodiment of a data transmission system, such as, but not limited to, a satellite system, comprises one or more transceivers 10, one or more receivers 12, and one or more transmission stations 14 (only one of which is shown in FIG. 1). The receivers may be, for example, satellite radio receivers such as are typically contained within vehicles like cars, trains, planes, boats etc. Transceivers 10 may be satellites in geosynchronous orbit, while transmission stations 10 may be ground stations in communication with one or more of the satellites. Signals, as described further below, are transmitted from at least one of the transmission stations 14 to at least one of the transceivers 10 which, in turn transmit to at least one of the receivers 12. The signals contain data such as video, radio programming containing songs, commercials, talk and the like. FIG. 2 illustrates a graphical representation of the system of FIG. 1, and shows a single transmission station 14, a single satellite 16 that contains a transceiver 10 (not shown in FIG. 2) and a plurality of vehicles 18, each of which would contain a receiver 12 (not shown in FIG. 2). A building or other obstruction 19 may interfere with transmission to the vehicles 18. Examples of other obstructions include bridges, tunnels, trees and clouds.

Figure 3:
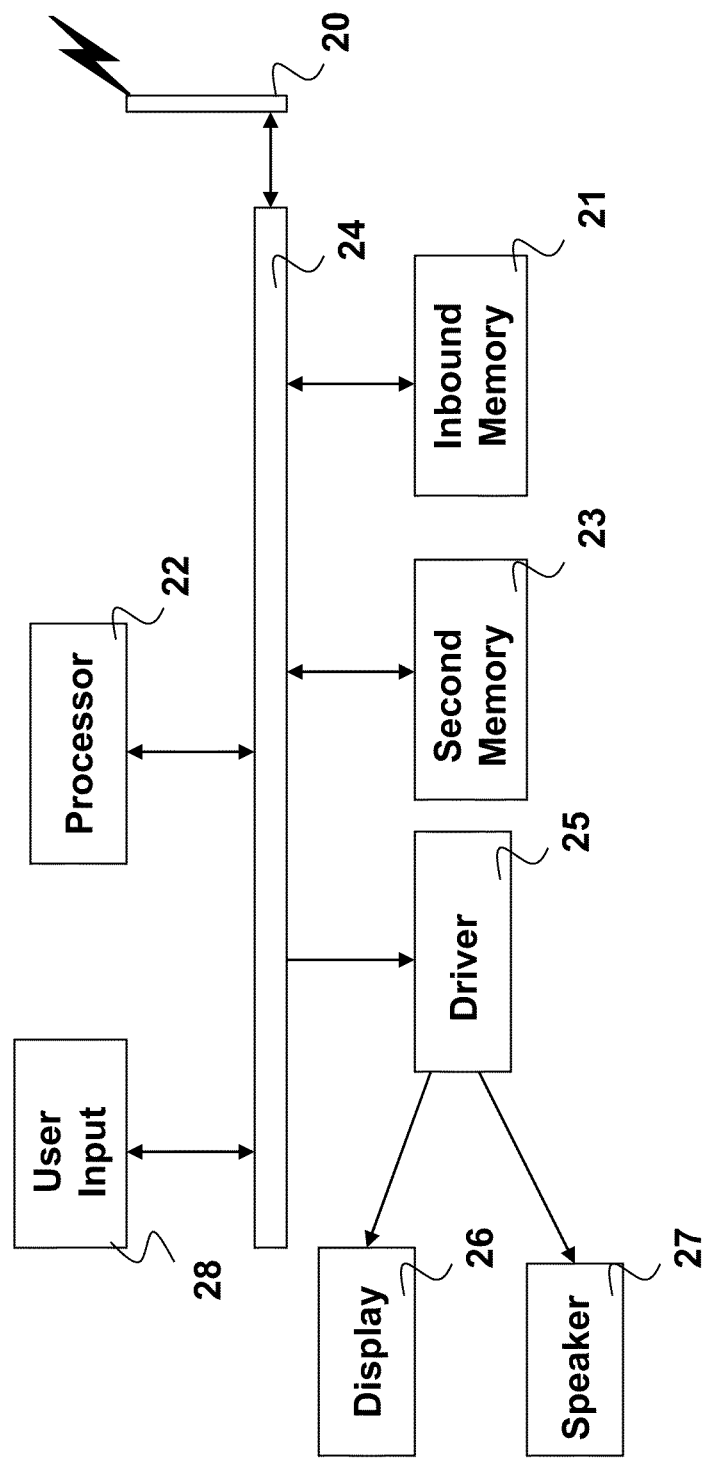
FIG. 3 is a block diagram showing more detail of a receiver 12 shown in FIG. 1.

FIG. 3 illustrates one embodiment of a receiver 12 in greater detail. The receiver includes an antenna system 20 having an antenna and associated circuitry, an inbound memory 21, a processor 22, a second memory 23, and a data bus 24 coupling the foregoing components. Receiver 12 further includes a video and/or audio driver 25 that drives a display 26 and/or a speaker 27. A user input device 28 is also coupled to data bus 24. User input 28 can be any suitable input device such as a touch screen, a series of buttons, a voice recognition system, etc.

Inbound memory 21 may be a memory that allows rapid storage and retrieval (such as RAM or FLASH). Second memory 23 should preferably be a non-volatile memory such as FLASH or a hard drive. Alternatively, memories 21 and 23 can be combined into one memory device. Antenna system 20 includes typical circuitry and hardware to enable successful receipt of the transmitted signal. This may include memory, a processor, error correction circuitry and/or software, security circuitry and/or software, etc.

Referring to FIGS. 1 and 3, in one aspect the system can function as follows. Content, such as video and music, is transmitted from the transmission station 14 to one or more of the transceivers 10. The received content is then retransmitted by the respective transceiver 10 to one or more of the receivers 12. For a given receiver 12, incoming data is delivered via antenna system 20 to inbound memory 21, typically under the control of processor 22 and using data bus 24. Alternatively, antenna system 20 may have sufficient circuitry and processing capability to deliver the received content to inbound memory 21 for further processing by the rest of the system.

Suitable software instructions can be stored in memory, such as second memory 23, the software allowing the processor 22 to carry out the steps explained herein. Under the control of microprocessor 22, the incoming data is used to drive output driver 25 to provide video and/or audio content to a user. The user input 28 can be used to change the channel, adjust the audio and/or video settings, etc.

Figure 4:
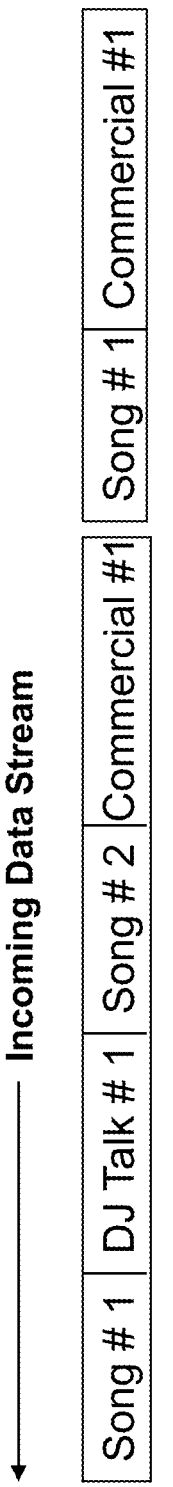
FIG. 4 illustrates, in graphical form, an example of content that may be transmitted to a receiver 12 of FIG. 1.

The transmitted content typically contains a substantial amount of data that is repeatedly transmitted over a period of time. For example, if the content of a typical music station is considered, much of the transmitted data consists of songs that are repeatedly transmitted. Other content, such as news and "DJ" chatter, may be transmitted less frequently or perhaps only a single time. Commercials are another example of content that is repeatedly transmitted. FIG. 4 illustrates, in graphical form, an example of content that may be transmitted to a receiver 12. The data stream contains data defining a number of individual segments, such as individual songs, commercials, etc. or portions thereof. As an example, FIG. 4 illustrates a first song (i.e., "Song No. 1"), followed by DJ chatter ("DJ Chatter No. 1"), a second song ("Song No. 2") and a commercial ("Commercial No. 1"). At a later point in time in this example, as indicated by the dotted lines, Song No. 1 is retransmitted, as is Commercial No. 1.

In a first embodiment of the invention, incoming data is both used to drive the output mechanism (e.g., speakers and/or display) as discussed above, and is further stored in memory 23. Thus, for example, as or after Song No. 1 is received, it is used to drive driver 25 and is also stored in memory 23. Each piece of incoming data may be similarly stored in memory 23. In this way, the system builds a database of transmitted content. As data is received at the inbound memory 21, microprocessor 22 compares the received data with data previously stored in memory 23 to see if any portion of the received data is a repeat transmission of earlier transmitted content. For example, referring to FIG. 4, the second time that Song. No. 1 is received, microprocessor 22 will recognize that the incoming song is a repeat of an earlier transmitted, and now presumably stored, song. This recognition process may occur very early in the transmission of a song, as it will only be necessary to compare enough of the beginning of the song to confirm its identity.

As discussed above, there will be occasions where the data stream received at a receiver 12 will be interrupted. For example, a vehicle containing receiver 12 might pass into a tunnel blocking access to the satellite containing transceiver 10. When this occurs, some portion of the received content will be lost. However, in accordance with this embodiment of the invention, as a particular retransmitted item, such as Song. No. 1, is played using driver 25, the system will be able to fill in any missing data in the transmission using the stored copy of the data. So, for example, if receiver 12 experiences an interruption in transmission during the second playing (or any subsequent playing) of Song. No. 1, the user of the system will not be affected by the interruption. Rather, the song can be played in its entirety, without interruption, using the stored copy of the content. In this way, the current embodiment avoids a common problem with any transmission system that is subject to interruptions, such as wireless transmission systems and enables smoother provision of content to a user.

Note that it is possible that there will be missing content during the first transmission of an item, such as during the first transmission of Song. No. 1 in FIG. 4. In such case, the system may store as much of Song. No. 1 as has been received. During subsequent transmissions of Song. No. 1, the system will "fill in the blanks" caused by the interruption experienced during the first transmission, thereby building a more complete copy of Song. No. 1. In addition, even if an incomplete copy of Song No. 1 is stored, that data can be used to fill in at least certain "blanks" caused by interruptions during a second transmission of Song. No. 1. So, incomplete data can still be useful during a second transmission.

Figure 5:
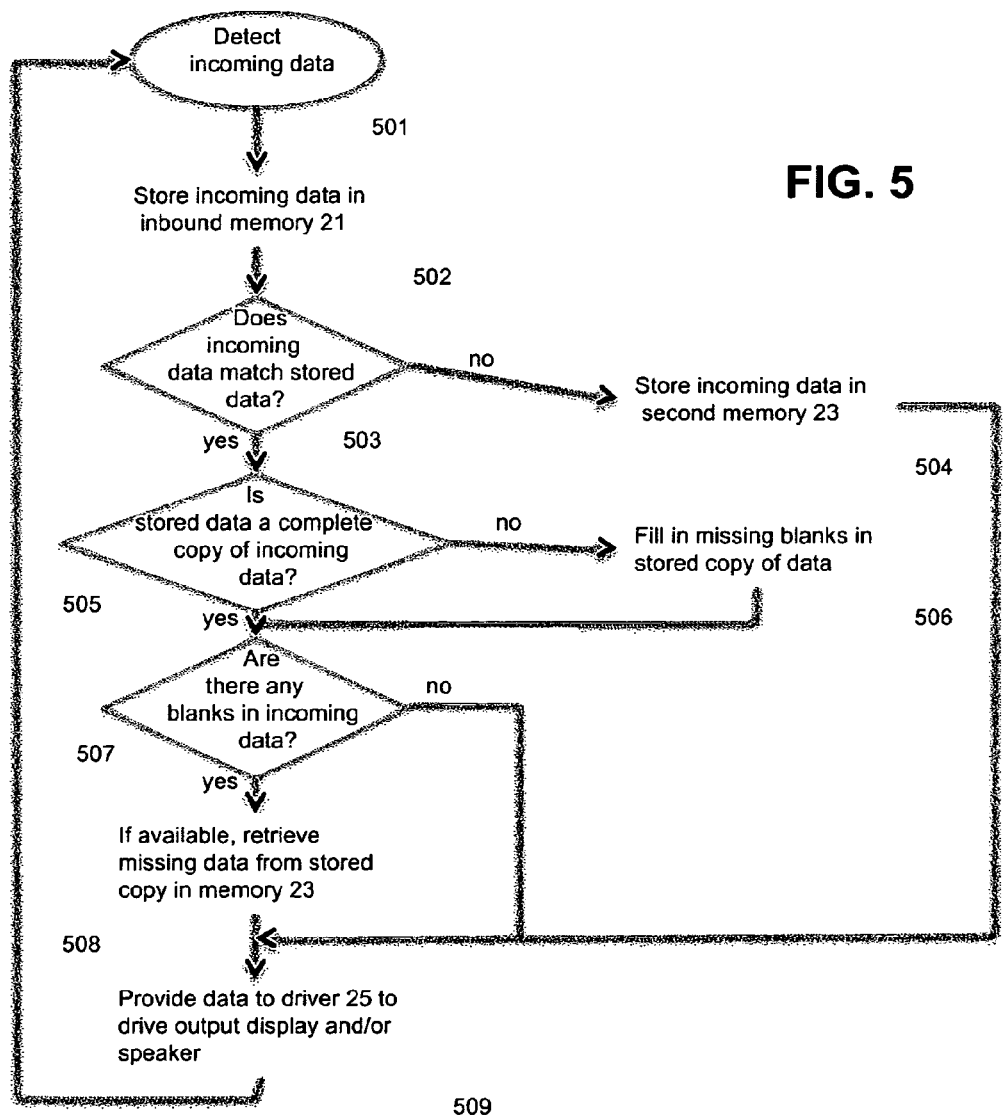
FIG. 5 is a flowchart showing one example of a method for implementing one embodiment of the invention.

FIG. 5 is a flowchart showing one example of a method for implementing one embodiment of the invention. In the first step of this flowchart (step 501) incoming data is detected. In the next step (step 502), the data is stored in inbound memory 21. In the next step (step 503) the system determines whether the received content matches a previously stored content. If it does not (possibly indicating the first receipt of the content), then a copy of the content is placed in second memory 23 (step 504).

If the received content is judged in step 503 to be a match for a previously stored content, then the system determines in step 505 whether the previously stored copy is a complete copy. If it is not, then the received data is used, if possible, to fill in any blanks in the stored version of the content to thereby create a more complete copy of the content in second memory 23 (step 506). If the received and stored versions of a particular item are both missing the same portion, then, of course, the system may not be able to improve the stored copy at this time. Step 506 improves the stored version to the extent possible using the incoming data.

If the system judges in step 505 that the stored version of the incoming content is complete, then it will transition to step 507, which determines whether there are any blanks in the incoming data. Similarly, after improving the stored copy of the data in step 506, the system transitions to step 507. If the incoming data does have one or more blanks (defined as any missing content), then the system will use the stored copy of the content to fill in those blanks, to the extent the stored content has the missing data (step 508).

Next, the system will provide the data to the output driver 25 (step 509) to drive the output display and/or speaker. Following this (or a similar) process will improve the delivery of content to the user since at least some blanks will be filled in using stored content.

The precise order of the steps in FIG. 5 is not critical as will be understood to those of skill in the art. For example, the order of steps 505 and 507 could be easily reversed. Furthermore, many of these steps could be done in parallel. The system can process incoming data in various appropriate portions. For example, an entire song can be processed at once or a defined portion of a song. In the case of digital data, a predetermined number of bytes could be processed at a time. Various buffers could also be used to ensure that there is a smooth delivery of data to the output driver. The output driver should not be kept "waiting" for data while it is being processed by the system. Thus, as will be understood by those skilled in the art, the incoming data is processed in such a way that the output driver is provided with data as it needs it.

In an alternative embodiment, the data stream to be processed is provided with a series of codes to facilitate processing. For example, each data segment (song, commercial, etc. or portion thereof) can be assigned certain codes. One code can be used to indicate that the received segment is of the type that will be retransmitted and thus should be stored (e.g., a song). Another code can be used to indicate that the received segment is of the type that will not be retransmitted (e.g., DJ chatter) and will not be stored. Similarly, the absence of a code can indicate either that the segment is of the first type or of the second type.

Codes also can be used to facilitate identification of the received content. For example, each segment that will be retransmitted can be assigned a unique identifying code. The code preferably comes at the beginning of the transmission of the segment so that the system can more easily identify the segment and determine whether or not it has been previously stored.

A code can also be used to indicate whether a stored copy of a segment is complete, and even to identify the incomplete portions. If a database is used to store the segments in second memory 23, then one field of the database can indicate whether the stored copy is complete and another field can indicate where the missing portions are, if there are any. As a further example, a segment can be broken up into "N" blocks, each of which has a unique identifier. As the blocks are stored, the system determines whether the block is complete and sets a "flag" to indicate the result. Then, on subsequent transmissions of that segment, the system can use these flags to locate blocks with missing data and fill in those "blanks" in the database.

In yet another alternative embodiment, a code can be transmitted instead of the content. More particularly, once a particular item has been transmitted and stored, there is no need to transmit the item a second time. Instead, the system can merely transmit a code that identifies the item. In a still further alternative embodiment, instead of transmitting a code, the system can transmit a sufficient portion of the content to identify it without transmitting the entire item. As explained further below, the content provider can maintain a database that specifies for each user which segments are stored.

In another alternative embodiment, the user will have the option to load copies of songs to the system. For example, the user may have purchased a copy of the song and can use the purchased copy to populate the database in second memory 23. User can simply plug in his music player containing such content and the system will locate copies of content not already stored and then store such content in memory. This will facilitate receipt of transmissions since even during the first receipt of a particular song, the system will be able to fill in missing blanks using the copy loaded by the user.

In another alternative embodiment, a user will have the option to substitute one segment for another. For example, if the user does not like "Song No. 2" then, the user can set the system to play some alternative content each time Song No. 2 is received. The alternative content can be one of a variety of things. The user can define a particular song to replace Song. No. 2. Alternatively, the user can set the system to play a random song instead of Song No. 2. The user can similarly replace commercials, or even DJ chatter, with alternative content. Furthermore, an interruption in delivery may occur for longer than any individual song or content. For example, on a stormy day, a user can lose reception from a satellite transmitter for an extended period of time. In such circumstances, the system can continue to deliver content to the user in a number of predefined ways. Random songs can be played, previous programming can be repeated, complete with commercials, etc.

In another alternative embodiment, the system can be used to facilitate the delivery of content to a user that is time shifted, i.e., it is presented to the user at a time other than when it is broadcast. For example, a particular content provider (such as a radio station) can send data specifying the programming to be delivered to the user in advance. The content can then be delivered when the user activates the system or can be delivered at a predetermined time. The use of codes identifying the stored segments can facilitate this alternative. If the particular segments are already stored on the user's system, then all that need be broadcast is a series of codes specifying the order in which the segments are to be played. The content provider can make assumptions about whether the content is stored on the user's system, e.g., if a particular song has been broadcast many times, then the content provider may conclude that every user is likely to already have a copy.

Alternatively, the content provider can keep a database of each user and a record of which segments are stored in that user's system. This information can be provided from the user's system to the content provider in a number of ways. A periodic cellular transmission from the user's system to the content provider can update the content provider's database for each user. The content provider can then make periodic deliveries of content on a user-by-user basis (using satellite broadcasts, cellular broadcasts or other means). Such customized deliveries can provide programming, complete data on segments not currently stored on the user's system, and even programming tailored to that user's preferences.

Figure 6:
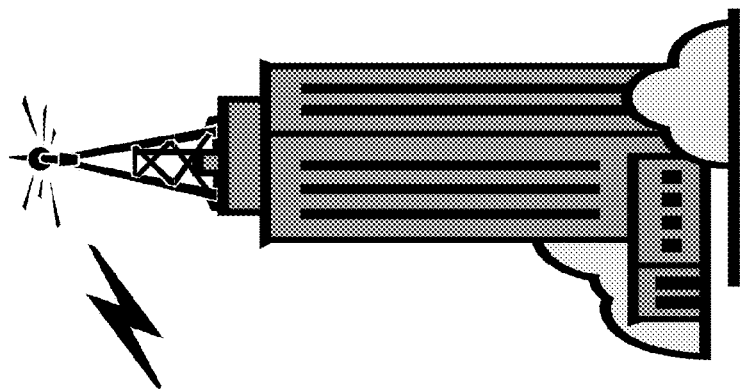
FIG. 6 is a graphical representation of an alternative embodiment of a data transmission system.
Figure 6:
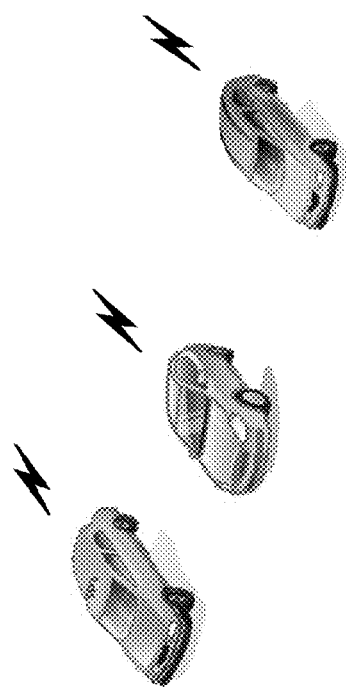

In a still further alternative embodiment, the transceivers 10 of FIG. 1 are eliminated and the transmitter 14 transmits directly to the receivers 12. Such a system is shown in FIG. 6, where a transmitter 14 is placed on top of building 19 such that it can broadcast directly to receivers contained within vehicles 18. Many different transmission systems are suitable with the present inventions, as will be understood by those of skill in the art.

The system may optionally include security to prevent copying and sharing of the transmitted content. For example, the transmission system can transmit keys that are required to unlock and play stored content. Such systems are well known to those of skill in the art.

The preceding description is for illustrative purposes only and there will be many additional variations and alternatives as will be understood to one of skill in the art.

The invention claimed is:

1. A system for delivering content to users from a content provider, the system comprising;
    a transmission system for transmitting content in a series of segments, each of said segments including an identification code, wherein said transmission system further transmits identification codes associated with previously transmitted segments;
    a plurality of receivers for receiving said series of segments transmitted from said transmission system and storing said segments, each of said receivers comprising a non-volatile memory, a processor, and an output driver, said non-volatile memory having stored therein instructions that, when executed, will cause said processor to perform the following steps:
        (1) upon receipt of a segment, storing said segment, including its associated identification code, in said non-volatile memory, and providing said segment to said output driver; and
        (2) upon receipt of an identification code without a segment, locating a previously stored segment associated with said received identification code and providing said previously stored segment to said output driver.

2. The system of claim 1 wherein said non-volatile memory comprises first and second physically distinct memories, each of which is coupled to said processor.

3. The system of claim 1 wherein said transmission system comprises a ground based antenna and a plurality of satellites.

4. The system of claim 1 wherein said series of segments comprises songs, each segment comprising a separate song.

5. The system of claim 1 wherein said series of segments comprises songs, commercials and talk.

6. The system of claim 1 further comprising an output device coupled to said output driver, said output device comprising a display and a speaker.

7. The system of claim 1 wherein each of said identification codes identifies its corresponding segment as either a segment that will be transmitted multiple times or as a segment that will be transmitted only once.

8. A system for receiving content transmitted to users, the system comprising;
    a plurality of receivers for receiving a series of segments, said series of segments being received during each of multiple periods of time, wherein said periods of time are not overlapping and are offset by an amount of time that is greater than the duration of at least one of said segments;
    wherein each of said receivers comprises a non-volatile memory, a processor, and an output driver, said non-volatile memory having stored therein instructions that, when executed, will cause said processor to perform the following steps:
        (1) comparing each of said segments received during a current one of said periods of time to any segments stored in said non-volatile memory during a previous one of said periods of time to determine whether each received segment has been previously stored in said non-volatile memory;
        (2) for a particular received segment that has not been previously stored, storing said segment in said non-volatile memory;
        (3) for a particular received segment that has been previously stored, determining whether said received segment is missing data and, if it is, retrieving said missing data, if available, from the corresponding previously stored segment; and
        (4) providing each of said received segments to said output driver along with any missing data retrieved from said non-volatile memory.

9. A system for receiving audio content transmitted to users, the system comprising;
    a plurality of receivers for receiving a series of audio segments, said series of audio segments being received during each of multiple periods of time, wherein said periods of time are not overlapping and are offset by an amount of time that is greater than the duration of at least one of said audio segments;
    wherein each of said receivers comprises a non-volatile memory, a processor, and an output driver, said non-volatile memory having stored therein instructions that, when executed, will cause said processor to perform the following steps:
        (1) comparing each of said audio segments received during a current one of said periods of time to any audio segments stored in said non-volatile memory during a previous one of said periods of time to determine whether each received audio segment has been previously stored in said non-volatile memory;
        (2) for a particular received audio segment that has not been previously stored, storing said audio segment in said non-volatile memory;
        (3) for a particular received audio segment that has been previously stored, (i) determining whether said received audio segment is missing data and, if it is, retrieving said missing data, if available, from the corresponding previously stored audio segment; and (ii) determining whether said previously stored audio segment is missing data and, if it is, obtaining the missing data from the received audio segment, if available, and storing the missing data in the non-volatile memory to thereby create a more complete copy of the audio segment in the non-volatile memory; and
        (4) providing each of said received audio segments to said output driver along with any missing data retrieved from said non-volatile memory.

* * * * *